(12) United States Patent
Martin et al.

(10) Patent No.: US 12,145,737 B2
(45) Date of Patent: Nov. 19, 2024

(54) DEVICE FOR CONTROLLING AN AIRCRAFT ENGINE COMPRISING TWO REDUNDANT CONTROL CHANNELS

(71) Applicant: Safran Aircraft Engines, Paris (FR)

(72) Inventors: Christophe Pierre Georges Martin, Moissy-Cramayel (FR); Sébastien Jacques François Michel Soulie, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 344 days.

(21) Appl. No.: 17/601,285

(22) PCT Filed: Apr. 2, 2020

(86) PCT No.: PCT/EP2020/059454
§ 371 (c)(1),
(2) Date: Oct. 4, 2021

(87) PCT Pub. No.: WO2020/201454
PCT Pub. Date: Oct. 8, 2020

(65) Prior Publication Data
US 2022/0177151 A1 Jun. 9, 2022

(30) Foreign Application Priority Data
Apr. 5, 2019 (FR) ...................... 1903675

(51) Int. Cl.
*B64D 31/00* (2024.01)
*F02C 7/00* (2006.01)
*G05B 9/03* (2006.01)

(52) U.S. Cl.
CPC ............... *B64D 31/00* (2013.01); *F02C 7/00* (2013.01); *G05B 9/03* (2013.01)

(58) Field of Classification Search
CPC .. B64D 31/00; F02C 7/00; G05B 9/03; G05B 2219/24175; G05B 2219/24182; G05B 2219/24184
(Continued)

(56) References Cited

U.S. PATENT DOCUMENTS 5,144,230 A 9/1992 Katoozi et al.
5,630,046 A 5/1997 Loise
(Continued)

FOREIGN PATENT DOCUMENTS

CN 106340207 A 1/2017
CN 108536004 A 9/2018
(Continued)

OTHER PUBLICATIONS

French Search Report and Written Opinion for French Application No. 1903675, dated Jan. 29, 2020.
(Continued)

*Primary Examiner* — Tyler D Paige
(74) *Attorney, Agent, or Firm* — Birch, Stewart, Kolasch & Birch, LLP

(57) ABSTRACT

The invention relates to an engine control device comprising a first control channel (V1) and a second control channel (V2), each control channel comprising a first sensor (CAV1, CAV2) and a second sensor (CBV2, CBV2), each configured to provide, respectively, a first measurement (A) and a second measurement (B) to each channel, each of the channels having an active or passive state defining an active channel (V1) or a passive channel (V2), the active channel (V1) being designed to control at least one actuator (ACT) of the engine while the passive channel (V2) is designed to take over for the active channel if the latter fails.

14 Claims, 3 Drawing Sheets

(58) Field of Classification Search
USPC .......................................................... 701/99
See application file for complete search history.

(56) References Cited

U.S. PATENT DOCUMENTS

| | | | | |
|---|---|---|---|---|
| 8,131,406 B2* | 3/2012 | Morris | ...................... | F02C 9/00 |
| | | | | 60/260 |
| 2004/0117102 A1* | 6/2004 | Weir | ........................ | G05B 9/03 |
| | | | | 701/1 |
| 2009/0240386 A1 | 9/2009 | Zaccaria et al. | | |
| 2009/0259350 A1* | 10/2009 | Morris | ...................... | F02C 9/00 |
| | | | | 701/3 |
| 2013/0192560 A1* | 8/2013 | Nobelen | ................. | F02B 77/08 |
| | | | | 123/319 |
| 2013/0319016 A1* | 12/2013 | Fontanel | ................. | F25B 21/04 |
| | | | | 62/3.61 |
| 2016/0202701 A1* | 7/2016 | Burte | .................... | B64C 13/505 |
| | | | | 701/3 |
| 2017/0008640 A1 | 1/2017 | Mere | | |

FOREIGN PATENT DOCUMENTS

| | | |
|---|---|---|
| EP | 0 724 218 A1 | 7/1996 |
| FR | 2 734 925 A1 | 12/1996 |
| FR | 2 986 398 A1 | 8/2013 |
| FR | 3 033 403 A1 | 9/2016 |
| FR | 3 038 709 A1 | 1/2017 |
| RU | 2 151 714 C1 | 6/2000 |
| RU | 2 353 549 C1 | 4/2009 |

OTHER PUBLICATIONS

International Search Report and Written Opinion of the International Searching Authority for International Application No. PCT/EP2020/059454, dated Apr. 2, 2020.
Russian Search Report for Russian Application No. 2021132192/28, dated Sep. 19, 2023.

* cited by examiner

DEVICE FOR CONTROLLING AN AIRCRAFT ENGINE COMPRISING TWO REDUNDANT CONTROL CHANNELS

GENERAL TECHNICAL FIELD

The invention relates to the control devices of aircraft engines of turbojet type. It more particularly relates to devices implementing computations given redundancy on the basis of measurements coming from sensors configured to measure engine parameters.

PRIOR ART

A turbojet engine is conventionally equipped with a control device which also provides protection from events with hazardous or catastrophic consequences such as cases of engine overspeed. Thus, one and the same device implements both these functions.

Such a control device generally comprises two identical channels which make it possible to provide redundancy in the acquisition of parameters and the computation of setpoints for controlling one or more actuators.

The channels are ideally independent from one another but they often exchange data to allow consolidation of the measurements. The objective of the consolidation is to have the two channels making the same computations at the same moment in the aim of ensuring the warm redundancy of the control device: one channel is active and controls the actuators and one channel is passive and is ready to become active at any moment should a malfunction occur in the system.

Specifically, a malfunction on one channel may lead to hazardous or catastrophic events.

If the control of the engine and the protection from these events are provided by the same device, it is necessary to make provision for monitoring of the processors that perform the computations to make sure that they are not malfunctioning.

Specifically, a malfunction of the processor may cause the engine to enter overspeed.

Such monitoring is implemented by comparing the results of the computations of each of the channels, a so-called active channel commands the actuators (for example the variable geometry and/or fuel metering valves of the engine). In the event of divergence between the computations, the passive channel is disabled and the control device becomes single-channel.

One problem is that by comparing only the results of the computations on each of the channels, it is not possible to discriminate between a malfunction of the processors and a problem of exchange between the channels.

Specifically, an interruption of the inter-channel link, even fleeting, stops the mutual monitoring and makes it necessary to secure the system, since it can give rise to a difference in computation. Securing consists in isolating the passive channel for the rest of the mission, thus penalizing the availability of redundancy for the mission and the availability of the computers in maintenance to perform the search for problems.

Hence the segregated channel can be the healthy channel since during a communication problem, one does not know if the error is located on the transmitter or receiver channel. If the remaining channel is malfunctioning and this malfunction is detectable by hardware self-tests, it ends up isolating itself, also leading to the flame-out of the engine. This type of behavior therefore penalizes the in-flight shutdown rate of the engine.

OVERVIEW OF THE INVENTION

The subject of the invention therefore consists in making the system more robust (i.e. resistant) to inter-channel link losses to make it possible to locate anomalies safely and thus make sure that only the malfunctioning channel isolates itself. For this purpose, the invention makes provision, in a first aspect, for a device for controlling an engine comprising a first control channel and a second control channel, each control channel comprising a first sensor and a second sensor, each configured to supply a first measurement and a second measurement to each channel respectively, each of the channels comprising an active or passive state defining an active channel or a passive channel, the active channel being intended to drive at least one actuator of the engine whereas the passive channel is intended to take over on the active channel in the event of malfunction of the latter, the device being such that each channel comprises:
- a unit for consolidating measurements, each receiving as input the measurements coming from the two channels by way of at least one inter-channel communication link in such a way as to obtain a consolidation parameter,
- a unit for processing at least one command of at least one actuator of the engine, the device comprising:
- a nominal operation in which the unit for computing each channel computes the command as a function of the consolidation parameter and of the command computed at the previous computing time, the actuator being driven by the active channel,
- a failsafe operation, in the event of interruption of the communication link, in which the unit for computing the passive channel computes the command as a function of the command computed by the active channel at the previous computing time.

The invention is advantageously completed by the following features, taken alone or in any of their technical possible combinations
- each channel further comprises a process-monitoring unit configured to detect a difference in the value of the command computed by the two channels
- the process-monitoring unit is configured to temporarily or definitively disable the passive channel if a difference in the value of the command computed by the two channels is detected.
- the consolidating unit takes an average of the values measured by the two channels.
- the processing unit of each channel performs a computation requiring at least one result computed by itself at a previous time increment.
- the processing unit of each channel performs a computation requiring at least one intermediate result computed by itself at a previous time increment.
- the failsafe operating mode is enabled for a period corresponding to the duration of the interruption of the at least one inter-channel communication link.
- the failsafe operating mode is enabled for a period corresponding to the time between the computing of an intermediate value and the furthest-away time during which a computation uses this value as initial datum.
- the failsafe operating mode is enabled for a predetermined time period estimated by communication link fault tests.

the process-monitoring unit is configured to definitively disable the passive channel if a difference in the value of the command computed by the two channels is detected immediately after the end of the failsafe operating mode.

when one of the two channels is waiting to receive measurements coming from the other channel, said other channel performs in advance the next scheduled computations not requiring any measurement coming from the second channel, of which it does not have the use at this time.

The advantages of the invention are several.

The availability of redundancy by increasing the robustness of the link to fleeting malfunctions. This contributes to also improving the availability of the protection when faced with catastrophic and hazardous risks.

The availability of the computers in maintenance by facilitating troubleshooting and also by reducing the proportion of computers with unconfirmed faults or computers wrongly removed.

The rate of in-flight engine shutdowns related to a malfunction of one of the two channels of the control device.

OVERVIEW OF THE FIGURES

Other features, aims and advantages of the invention will become apparent from the following description, which is purely illustrative and non-limiting, and which must be read with reference to the appended drawings wherein.

Figure 3:
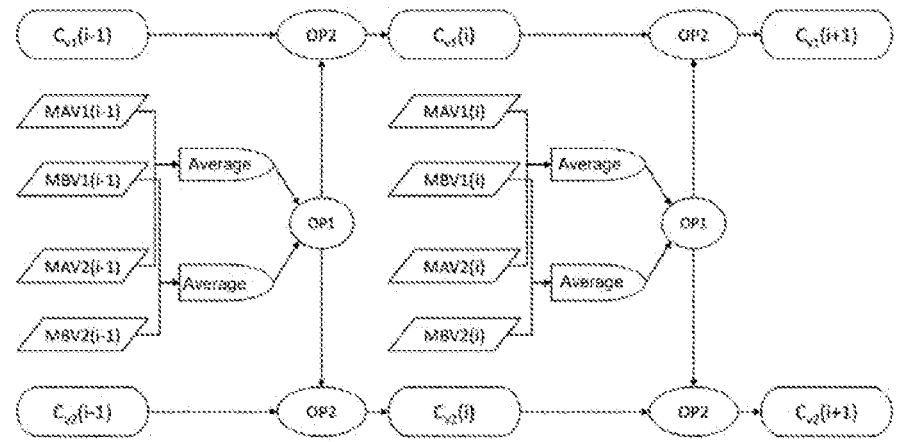
Figure 4:
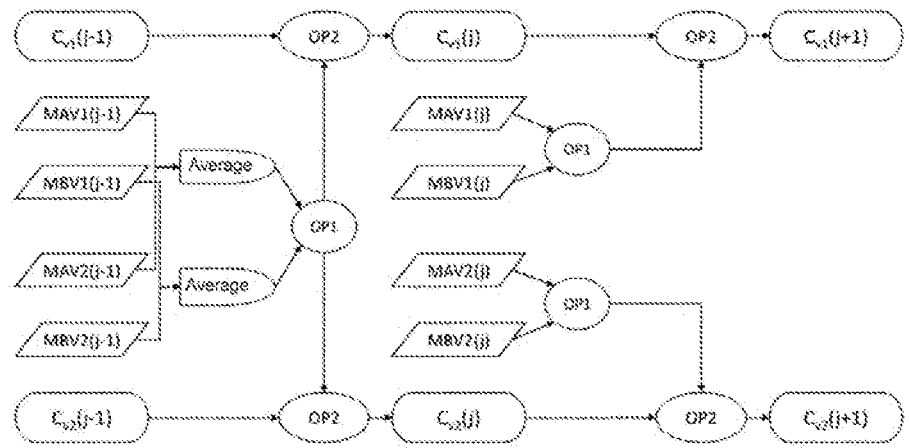
Figure 5:
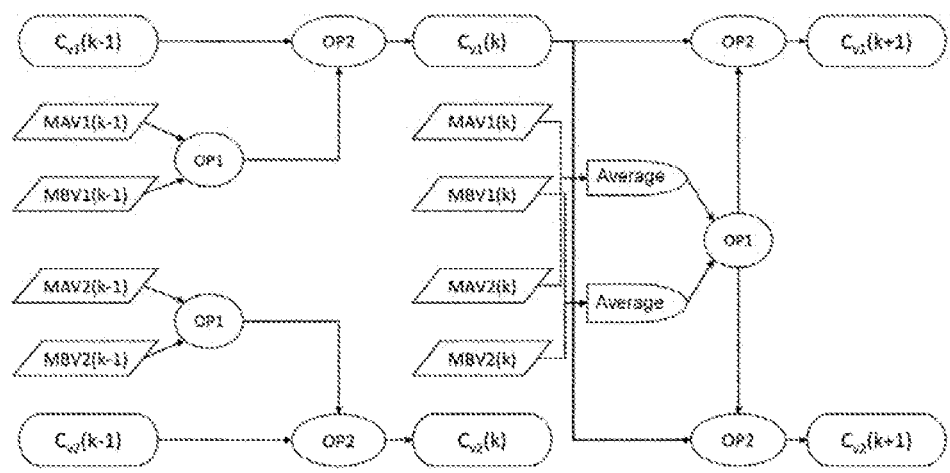

FIGS. 3 to 5 schematically illustrate processing steps implemented in the control device.

In all the figures similar elements bear identical reference numbers.

DETAILED DESCRIPTION OF THE INVENTION

Figure 1:
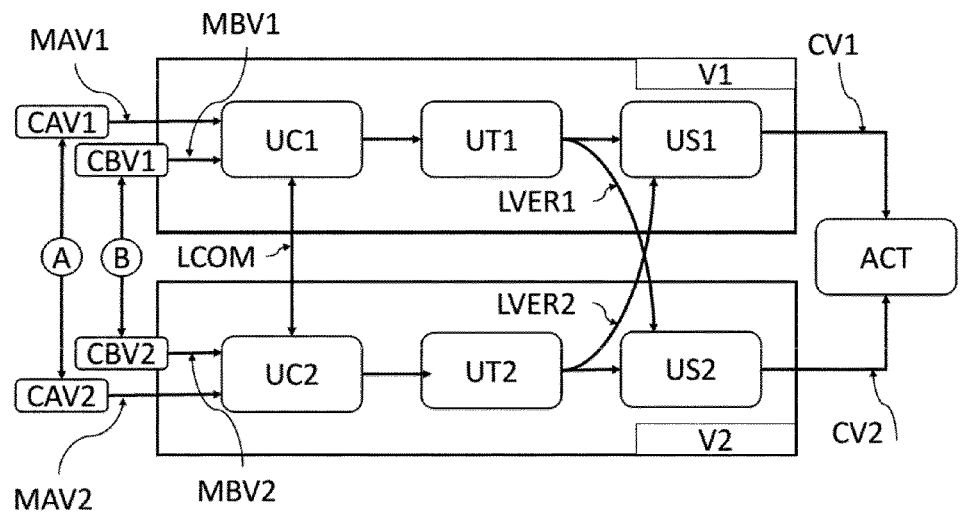
FIG. 1 illustrates an example of a device for controlling an engine including two channels according to an embodiment of the invention.

FIG. 1 illustrates a device for controlling an engine according to an embodiment of the invention. The engine is preferably that of an aircraft such as a turbomachine.

The control device comprises two control channels: a first control channel V1 and a second control channel V2.

Each control channel V1, V2 makes it possible to drive at least one actuator ACT as a function of a computed command or setpoint $C_{V1}$, $C_{V2}$. In operation only one of the two channels drives the actuator ACT. This is the active channel. The other channel is considered as passive and makes it possible to take over on the active channel if said active channel has a malfunction.

Each control channel V1, V2 receives as input quantities A, B to be measured, on the basis of which the command of the actuator ACT is computed. These quantities are for example: temperature etc.

In the example illustrated in FIG. 1, each channel receives two different quantities A, B to be measured, each channel measuring the same quantities. In particular, for each channel V1, V2 these quantities are measured by different or identical sensors:

For the first channel V1: a first measurement MAV1 of the first quantity A is measured by a first sensor CAV1 and a second measurement MBV1 of a second quantity B is measured by a second sensor CBV1.

For the second channel V2: a first measurement MAV2 of the first quantity A is measured by a first sensor CAV2 and second measurement MBV2 of the second quantity B is measured by a second sensor CBV2.

The sensors used depend on the quantities measured: a temperature sensor for the temperature etc.

In order to determine a command $C_{V1}$, $C_{V2}$ each channel will perform a certain number of processing actions on the measurements taken.

In particular, each channel comprises a consolidating unit UC1, UC2 making it possible to unify data measured by the sensors of each of the two channels by a consolidation process, for example by taking an average of the values measured by the sensors of each of the two channels.

As will be understood, there is an exchange of data between the channels V1, V2 by means of an inter-channel communication link LCOM.

For each channel, the result of the consolidation is then used by a processing unit UT1, UT2 which will compute the setpoints $C_{V1}$, $C_{V2}$ for the actuator ACT. Advantageously, the processing unit UT1, UT2 can use as input data the commands computed at one or more previous computing times as well as intermediate results computed at one or more previous computing times. In this case, the processing unit may comprise a first computing module MOD1 and a second computing module MOD2: one of them performs the first part of the computations, and the second performs the computations requiring the intermediate computations performed previously (see FIG. 2). The data coming from the first module are retrieved by the second module with a delay, typically of 1 to 4 computing times.

Under normal operation, the setpoints $C_{V1}$, $C_{V2}$ computed by each of the channels are identical. To ensure that this is indeed the case, each channel also comprises a monitoring unit US1, US2, in charge of checking that the computed commands $C_{V1}$, $C_{V2}$ are indeed identical. To be able to perform this comparison of the computed commands, the monitoring unit US1, US2 receives the commands computed by the channel to which it belongs, as well as those computed by the other channel via a communication link LVER2, LVER1.

When a difference is detected between the two computed commands $C_{V1}$, $C_{V2}$, self-test mechanisms of the processing units UT1, UT2 make it possible to identify where the errors may come from and disable one of the channels which in this case does not escalate information to the other channel. In this case, it is possible to select the channel that will be in the "active" state or in the "passive" state, and to disable the one which is in the "passive" state.

As mentioned in the introduction, this is because the control channels V1, V2 each have an "active" or "passive" state indicator. This makes it possible to determine which channel effectively controls the actuator(s) ACT of the engine. These states are exclusive: the two channels V1, V2 cannot be in the same state, one must be active and the other passive.

On the other hand, if the source of the error is not detected by the self-test mechanisms of the processing units, the passive voice is always disabled. The redundancy provided by it is then lost. As will be understood, when this happens it is possible for a channel to be disabled when it does not have a problem, since the problem may come from the at least one inter-channel communication link LCOM. Consequently, rather than disabling the passive channel and supposing that the problem comes from the inter-channel communication link LCOM, the control device will exhibit a failsafe operating mode in which the commands computed by the processing units UT1, UT2 will be transmitted. In particular, this transmission is done from the active channel to the passive channel. It makes it possible, when the computations performed by the processing unit are based on results computed in a previous time increment, to unify the input data of the computing units of the two channels in order to allow the convergence of the commands after a certain number of time increments.

Advantageously, for a processing unit the computing time is set to a duration t, for example between 5 and 50 ms, typically t=15 ms, which is limited and the exceeding of this duration gives rise to an exception of the processing unit and the disabling of the channel concerned by the exception. It is therefore necessary to be careful as regards the computing load executed on the processing unit. In the event of an interruption in the communication link between the channels V1, V2, it is necessary, on re-establishment of the inter-channel communication link LCOM, to follow the mechanisms for transmitting the computed commands to ensure the reconvergence of the computations. This gives rise to a computing overload of the processing unit. It is therefore necessary to optimize the duration of the exchanges and the ordering of the computations to comply with the time constraints of the processing unit.

Exemplary Embodiment of the Failsafe Operation of the Control Device According to a Preferred Embodiment of the Invention Such an example is illustrated in FIGS. 3 to 5. The example shown is that of a computation taking into account only a result at the previous time increment $$t=i-1$$

in this example, let $$C_{V1}(0)=C_{V2}(0).$$

As long as the system does not undergo any fault in the inter-channel link, the computations take place as illustrated in FIG. 3. Furthermore, in this example, the channel V1 is the active channel while the channel V2 is the passive channel.

To determine the command to be applied to the actuator ACT at a time increment $$t=i$$

computations are made on the basis of the data measured by the sensors associated with the control channels. In a simplified example, the following computations are performed:

$$C_{V1}(i)=C_{V1}(i-1)+\text{average}(i)$$

$$C_{V2}(i)=C_{V2}(i-1)\text{average}(i)$$

with:

$$\text{average }(i) = \frac{(MAV1(i)+MAV2(i))}{2} + \frac{(MBV1(i)+MBV2(i))}{2}$$

Figure 2:
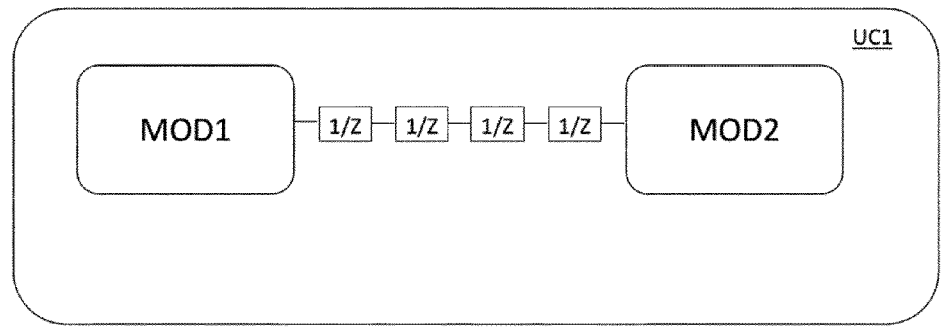
FIG. 2 illustrates an exemplary embodiment of a processing unit of the control device according to the invention.

Which corresponds to FIG. 2 where the operators OP1, OP2 are for example sums of the two terms taken as input. Other operators may also be envisioned.

It is obvious here that after the computations described previously, in the context of a nominal operating rating, if one agrees that in the previous computing increment one does indeed have:

$$C_{V1}(i)=C_{V2}(i),$$

then in the current computing increment, the following equality is indeed verified:

$$C_{V1}(i+1)=C_{V2}(i+1)$$

On the other hand, when an interruption occurs on the inter-channel communication link at a time $$j$$

the consolidating units are no longer able to exchange the data measured by the sensors connected to their respective channels. The computations performed by the processing unit then occur as shown in FIG. 4: each of the two channels performs the computations given previously in the consolidating step (here the average). The processing unit therefore performs the following computations:

$$C_{V1}(j)=C_{V1}(j-1)+MAV1(j)+MBV1(j)$$

$$C_{V2}(j)=C_{V2}(j-1)+MAV2(J)MBV2(j)$$

However, the data of the same kind measured by the sensors of each of the two channels are in practice always different (this is why consolidation is necessary). This gives:

$$MAV1(j)+MBV1(j)\neq MAV2(j)+MBV2(j)$$

And in this case the commands computed by the two channels are no longer identical:

$$C_{V1}(j)\neq C_{V2}(j)$$

This divergence of the computed commands is detected as an error by the monitoring units. In addition, even if the link is re-established, the previous computations being different after processing, the computed commands will remain different from one channel to the other.

To palliate this problem, the solution consists in sending the results computed by the active channel (in this example the channel V1) to the passive channel (in this example channel V2) when the link is re-established at a time $$k$$

as shown in FIG. 5. The computations made here are as follows:

$$C_{V1}(k+1)=C_{V1}(k)+\text{average}(k+1)$$

$$C_{V2}(k+1)=C_{V1}(k)+\text{average}(k+1)$$

Hence:

$$C_{V1}(k+1)=C_{V2}(k+1)$$

Note that the values of the commands $C_{V1}$, $C_{V2}$ are identical to the re-establishment of the inter-channel communication link LCOM.

Possible Example of Implementation

By way of example the processing units of each of the two channels may be split into two modules MOD1, MOD2 as illustrated in FIG. 2. In this case, the computations made are based on several previous results. More precisely, the computations made use the results of the 4 previous commands as well as the intermediate results coming from the 3 previous computing times. In such a case, it is therefore necessary to exchange the commands computed during several computing times, to optimize as much as possible the duration of these exchanges which are expensive in computing time. These must be performed during the shortest time possible:

when one or more previous commands are used as input of the processing units with a delay time $$r_1,$$

measured in number of computing times, the commands must be transmitted from the active channel to the passive channel during a number of computing times equivalent to the duration of the interruption of the link when one or more previous intermediate results are used with a delay $$r_2$$

the commands must be transmitted from the active channel to the passive channel during $$r_2$$

computing increments.

In addition, in order to satisfy the real-time system requirements specific to any on-board control device, the duration of each cycle cannot exceed a predetermined duration, for example 15 ms, so it is necessary to optimize the order of the operations added to continue to comply with this constraint. To do this, the ordering of the tasks performed by the processing units is modified in order to perform computations when these are awaiting the reception of data over a data link. In this way computing time is freed up:

In nominal operating mode, in the absence of any fault;
In failsafe operating mode, during the communication fault;
In failsafe operating mode, after the feedback of the inter-channel link, during the exchange of data from the active channel to the passive channel.

This freed-up computing time thus makes it possible to comply with the imposed time constraints and to perform additional self-tests to detect a malfunction of a component of one of the two channels.

The invention claimed is:

1. A device for controlling an actuator of an engine, the device comprising:
an active control channel comprising a first consolidating unit, configured to compute a first consolidation parameter, and a first processing unit, configured to process a first command, the command being function of the first consolidation parameter and configured to drive the actuator; and
a passive control channel, comprising a second consolidating unit, configured to compute a second consolidation parameter, and a second processing unit configured to process a second command, the command being function of the second consolidation parameter;
the device further comprising an inter-channel communication link between the first consolidating unit and the second consolidating unit;
wherein, the first consolidating unit is configured to compute the first consolidation parameter based on:
a first measurement of a first parameter and a first measurement of a second parameter respectively supplied by a first sensor and a second sensor to the first consolidating unit, and
a second measurement of the first parameter and a second measurement of the second parameter respectively supplied by a third sensor and a fourth sensor to the first consolidating unit by the second consolidating unit through the inter-channel communication link;
wherein, the second consolidating unit is configured to compute the second consolidation parameter based on:

the second measurement of the first parameter and the second measurement of the second parameter respectively supplied by the third sensor and the fourth sensor to the second consolidating unit, and
the first measurement of the first parameter and the first measurement of the second parameter respectively supplied by the first sensor and the second sensor to the second consolidating unit by the first consolidating unit, through the inter-channel communication link;
wherein the device presents a nominal operating mode in which:
the first command is processed as a function of the first consolidation parameter and of the first command processed at a previous computing time, and
the second command is processed as a function of the second consolidation parameter and of the second command processed at a previous computing time;
wherein the device presents a failsafe operating mode, to unify the first command and the second command after an interruption of the inter-channel communication link, in which:
the second command is processed as a function of the second consolidation parameter and of the first command processed by the active channel at the previous computing time.

2. The device as claimed in claim 1, wherein the active control channel comprises a first process-monitoring unit configured to detect a difference in the value of the first command and the second command, and the passive control channel comprises a second process-monitoring unit configured to detect a difference in the value of the first command and the second command.

3. The device as claimed in claim 2, wherein the second process-monitoring unit is configured to temporarily or definitively disable the passive control channel if a difference in the value of the first command and the second command is detected.

4. The device as claimed in claim 1, wherein the passive control channel is configured to become the active control channel and drive the actuator with the second command when the active control channel is in a passive state.

5. The device as in claim 1, wherein each of the first consolidation parameter and the second consolidation parameter is an average of the first measurement of the first parameter, the first measurement of the second parameter, the second measurement of the first parameter and the second measurement of the second parameter.

6. The device as in claim 1, wherein each of the first processing unit and the second processing unit performs a processing requiring at least one intermediate result processed at a previous time increment.

7. The device as in claim 1, wherein the failsafe operating mode is enabled for a period corresponding to the duration of the interruption of the inter-channel communication link.

8. The device as in claim 1, wherein the failsafe operating mode is enabled for a period corresponding to the time between the computing of an intermediate value and the furthest-away time during which a computation uses this value as initial datum.

9. The device as in claim 1, wherein the failsafe operating mode is enabled for a predetermined time period estimated by communication link fault tests.

10. The device as in claim 1, wherein the process-monitoring unit is configured to definitively disable the passive control channel if a difference in the value of the first command and the second command is detected immediately after the end of the failsafe operating mode.

11. The device as in claim 1, wherein when one of the active control channel and passive control channel is waiting to receive measurements through the inter-communication link, the one of the active control channel and the passive control channel performs in advance the next scheduled computations not requiring any measurement through the inter-channel communication link.

12. Method to control an actuator of an engine, the device comprising:
- an active control channel comprising a first consolidating unit, configured to compute a first consolidation parameter, and a first processing unit configured to process a first command, the command being function of the first consolidation parameter and configured to drive the actuator; and
- a passive control channel, comprising a second consolidating unit, configured to compute a second consolidation parameter, and a second processing unit configured to process a second command, the command being function of the second consolidation parameter;
- the device further comprising an inter-channel communication link between the first consolidating unit and the second consolidating unit;
- wherein, the first consolidating unit is configured to compute the first consolidation parameter based on:
- a first measurement of a first parameter and a first measurement of a second parameter respectively supplied by a first sensor and a second sensor to the first consolidating unit, and
- a second measurement of the first parameter and a second measurement of the second parameter respectively supplied by a third sensor and a fourth sensor to the first consolidating unit by the second consolidating, unit through the inter-channel communication link;
- wherein, the second consolidating unit is configured to compute the second consolidation parameter based on:
- the second measurement of the first parameter and the second measurement of the second parameter respectively supplied by the third sensor and the fourth sensor to the second consolidating unit, and
- the first measurement of the first parameter and the first measurement of the second parameter respectively supplied by the first sensor and the second sensor to the second consolidating unit by the first consolidating unit, through the inter-communication link;
- the method comprising:
- during a nominal operating mode:
- a processing of the first command as a function of the first consolidation parameter and of the first command processed at the previous computing time, and
- a processing of the second command as a function of the second consolidation parameter and of the second command processed at the previous computing time;
- during a failsafe operation implemented when the inter-communication link is reestablished after an interruption of the inter-channel communication link:
- the second command is processed as a function of the second consolidation parameter and of the first command processed by the active channel at the previous computing time,
- wherein the failsafe operation unify the first command and the second command after an interruption of the inter-channel communication link.

13. Method according to claim 12, the method comprising:
- an acquisition of the first measurement of the first parameter and the first measurement of the second parameter respectively by the first sensor and the second sensor and of the second measurement of the first parameter and the second measurement of the second parameter respectively by the third sensor and the fourth sensor,
- exchanging of the first measurement of first parameter and the first measurement of the second parameter from the active control channel to the passive control channel and of the second measurement of the first parameter the second measurement of the second parameter between from the passive control channel to the active control channel by the inter-channel communication link;
- computing the first consolidation parameter and the second consolidation parameter respectively by the first consolidating unit and the second consolidating unit;
- processing the first command by the first processing unit depending on the first consolidation parameter and a first command previously processed by the first processing unit, and the second command by the second processing unit depending on the second consolidation parameter and a second command previously processed by the second processing unit;
- driving the actuator with the first command, whereas the passive control channel is intended to take over from the active control channel in the event of a malfunction of the active control channel.

14. Method according to claim 13, wherein, during an interruption of the inter-channel communication link impeaching the exchanging, the method comprises:
- processing the first command by the first processing unit as a sum of the first measurement and the first command processed at the previous computing time; and
- processing the second command by the second processing unit as a sum of the second measurement and a second command previously processed by the second processing unit.

* * * * *